United States Patent
Lee

(10) Patent No.: US 7,966,009 B2
(45) Date of Patent: Jun. 21, 2011

(54) METHOD FOR DETERMINING THE STATUS OF A WIRELESS NETWORK COMMUNICATION DEVICE

(75) Inventor: Chih-Fang Lee, Hsinchu (TW)

(73) Assignee: ARCADYAN Technology Corporation, Science-Based Industrial Park, Hsingchu (TW)

( * ) Notice: Subject to any disclaimer, the term of this patent is extended or adjusted under 35 U.S.C. 154(b) by 1188 days.

(21) Appl. No.: 11/612,521

(22) Filed: Dec. 19, 2006

(65) Prior Publication Data

US 2007/0149133 A1 Jun. 28, 2007

(30) Foreign Application Priority Data

Dec. 23, 2005 (TW) .............................. 94146329 A

(51) Int. Cl.
*H04W 24/00* (2009.01)
(52) U.S. Cl. ........ 455/423; 455/572; 455/573; 455/574; 455/343.1; 455/343.2; 455/343.3; 455/343.4; 455/343.5; 455/424; 455/425
(58) Field of Classification Search .......... 455/423–425, 455/572–574, 343.1–343.5
See application file for complete search history.

(56) References Cited

U.S. PATENT DOCUMENTS

| | | | | |
|---|---|---|---|---|
| 5,870,385 A * | 2/1999 | Ahmadi et al. | ............... | 370/252 |
| 6,505,058 B1 * | 1/2003 | Willey | ........................... | 455/574 |
| 7,295,827 B2 * | 11/2007 | Liu et al. | ..................... | 455/343.2 |
| 7,505,795 B1 * | 3/2009 | Lim et al. | ....................... | 455/574 |
| 2006/0039320 A1 * | 2/2006 | Kang et al. | ..................... | 370/328 |
| 2006/0094476 A1 * | 5/2006 | Guy | ............................. | 455/574 |

* cited by examiner

*Primary Examiner* — Kamran Afshar
*Assistant Examiner* — Lameka J Kirk
(74) *Attorney, Agent, or Firm* — Chih Feng Yeh; Huntington IP Consulting Co. Ltd.

(57) ABSTRACT

The present invention discloses a method for determining the working status of a wireless network communication device. The method includes determining the probe request or broadcast packet or any wireless packet with its destination address equal to this AP address, and then determining whether extending the time interval of signal transmission based on the detection result. Next, when the device does not receive the probe requests or broadcast packet or any wireless packet with its destination address equal to this AP address within the first predetermined interval, the wireless network communication device will switch to the idle mode. Further, the step of the present invention includes determining whether awakening or shutdown the wireless network communication device based on the result of the detection of the probe request or broadcast packet or any wireless packet with its destination address equal to this AP address within the second predetermined interval.

17 Claims, 2 Drawing Sheets

METHOD FOR DETERMINING THE STATUS OF A WIRELESS NETWORK COMMUNICATION DEVICE

TECHNICAL FIELD OF THE PRESENT INVENTION

The invention relates to a wireless network communication device, more particularly, relates to a method determining a working status of a wireless network communication device to enhance its performance.

BACKGROUND OF THE INVENTION

An access point (AP), known as a wireless bridge or wireless access point or a wireless station, is traditionally served as a bridge between wired local area networks (LANs) and wireless local area network; it also can serve as a wireless transceiver for wireless local area networks. Therefore, any personal computer equipped with a wireless network card can act as a bridge between wireless networks and LANs to share resources on LANs or wide area networks. Besides that, a wireless bridge also can work as networking management unit performing necessary control over personal computers equipped with a wireless network card. The two characters of a wireless bridge mentioned above constitute the important aspect of a wireless bridge for network communication application; therefore, utilizing a wireless bridge, we can enhance the security of wireless networks and offer wireless network users higher authority to access the resources on networks.

A wireless bridge is an exchanger for wireless networks providing the function for transmitting wireless signal. The signal transmitted by a wireless bridge through twisted pair wire (TP), and then compiled by wireless bridge to transform the telecommunication signals to wireless signals. Then, the radiating wireless signals form a wireless network cover; according to the power of the signals, different range or level of signal covers are formed. In general, the maximum distance of a signal cover formed by an ordinary wireless bridge reaches 300 m.

In general, a wireless bridge can't function as a router; therefore, the services including Domain Naming Services (DNS), Dynamic Host Configuration Protocol (DHCP), Firewall should be provided by an independent router or computer. Nowadays, most wireless bridge can support multi access (30-100 sets of PC). Data encryption, multiple speed transmission and only one wireless bridge can deal with all wireless connection demand of all computers for household or applications.

However, when a wireless bridge turns on, no matter terminal instrument transmits signals requesting for connection or not, the bridge would continuously transmit signals for providing uninterrupted service until it shuts down. However, it would constitute interference to the operation of other electronics surrounding the wireless bridge; further more, ceaseless electromagnetic wave radiation may cause doubt relating to health. Therefore, to meet consumers' demand and the uphold idea of environmental protection, it is necessary for a technical product to take health into consideration.

Therefore, the present invention provides a wireless network communication device with different transmission modes; the present invention can provide different wireless signal transmission modes or status according to the environment to overcome the shortcomings of prior arts, and to enhance the performance of a wireless network communication device,

BRIEF SUMMARY OF THE PRESENT INVENTION

The invention will now be described in greater detail with embodiments of the present invention. However it is note worthy that the present invention is not limited to the embodiments described here; rather, the present invention also applies to a wide range of embodiments and only limited by the following claims.

One advantage of the present invention is providing a wireless network communication device with different signal transmission modes, by which a wireless network communication device can adjust the transmission mode or status of wireless signal according to the environment. Therefore the invention can reduce the interference to surrounding electronics and danger to human body caused by signals continuously transmitted from a wireless network communication device.

Another advantage of the present invention is providing a method for determining the working status of a wireless network communication device. According to the result of signal detection, the method can determine a working status of a wireless network communication device.

The transmission modes mentioned above include normal mode, extended mode, and no-transmission mode. The statuses of wireless signal transmission include a normal working mode, a delay mode, and an idle mode. The present method can apply to fixed network environment, including household, public place or office environment.

The wireless network communication device mentioned above include a router, a gate way, a bridge or an access point.

The present invention provides a method for determining the working status of a wireless network communication device including detecting a requesting signal probe request) or an environment searching signal transmitted from a terminal instrument; then, according to the result of detection, determining whether to extend the interval of signal transmission. If the wireless network communication device doesn't receive a requesting (probe request) signal or an environment searching signal transmitted from a terminal instrument in the first predetermined interval, the device enters into delay mode. The present invention further includes, according to whether detecting an requesting signal or an environment searching signal transmitted from a terminal instrument in the second predetermined interval, determining the bridge should be awaken or enter into idle mode.

By the method of the present invention, when detecting an requesting signal or an environment searching signal transmitted from a terminal instrument, the wireless network communication device keeps the current interval for signal transmission; otherwise, the wireless network communication device extends the interval of signal transmission; wherein the steps for extending the interval of the beacons signal transmission can repeat for multiple times and extend the span of the interval progressively.

Furthermore, if detecting an requesting signal or an environment searching signal transmitted from a terminal instrument in the first predetermined interval, the wireless network communication device is awaken; otherwise the wireless network communication device entering into delay mode.

Similarly, when detecting the requesting signal or an environment searching signal transmitted from a terminal instrument in the second predetermined interval, the wireless network communication device is awaken; otherwise the wireless network communication device enters into an idle mode.

A wireless network communication device includes a signal transmission module to transmit signals to terminal instrument and to adjust the interval of signal transmission. A wireless network communication device also includes a signal detection module to detect a requesting signal or an environmental searching signal transmitted from a terminal instrument.

Similar to a wireless network communication device, a terminal instrument includes a signal transmission module to transmit a requesting signal or an environment searching signal to a wireless network communication device, and a signal detection module to detect a signal transmitted from a wireless network communication device.

BRIEF DESCRIPTION OF THE DRAWINGS

By referring to the detailed description below and the viewpoint above, we can understand the advantages of the present invention; moreover, the attached figures and relating illustration would further help us to understand the spirit of the invention; wherein.

DETAILED DESCRIPTION OF THE PRESENT INVENTION

The invention will now be described in greater detail with embodiments and illustrations attached of the present invention. Nevertheless, it will be understood by those skilled in the art that the present invention should not be limited to the described preferred embodiments; furthermore, the well known structures, materials and methods are not described in detail here in avoid of blur the main aspects of the present invention. In the flowing paragraph, we only take a wireless bridge as an example for illustration of the present invention; however, those skilled in the art understand the illustrations can applied to the changes and modifications of the present invention, for example, routers, gateways and access points.

Figure 1:
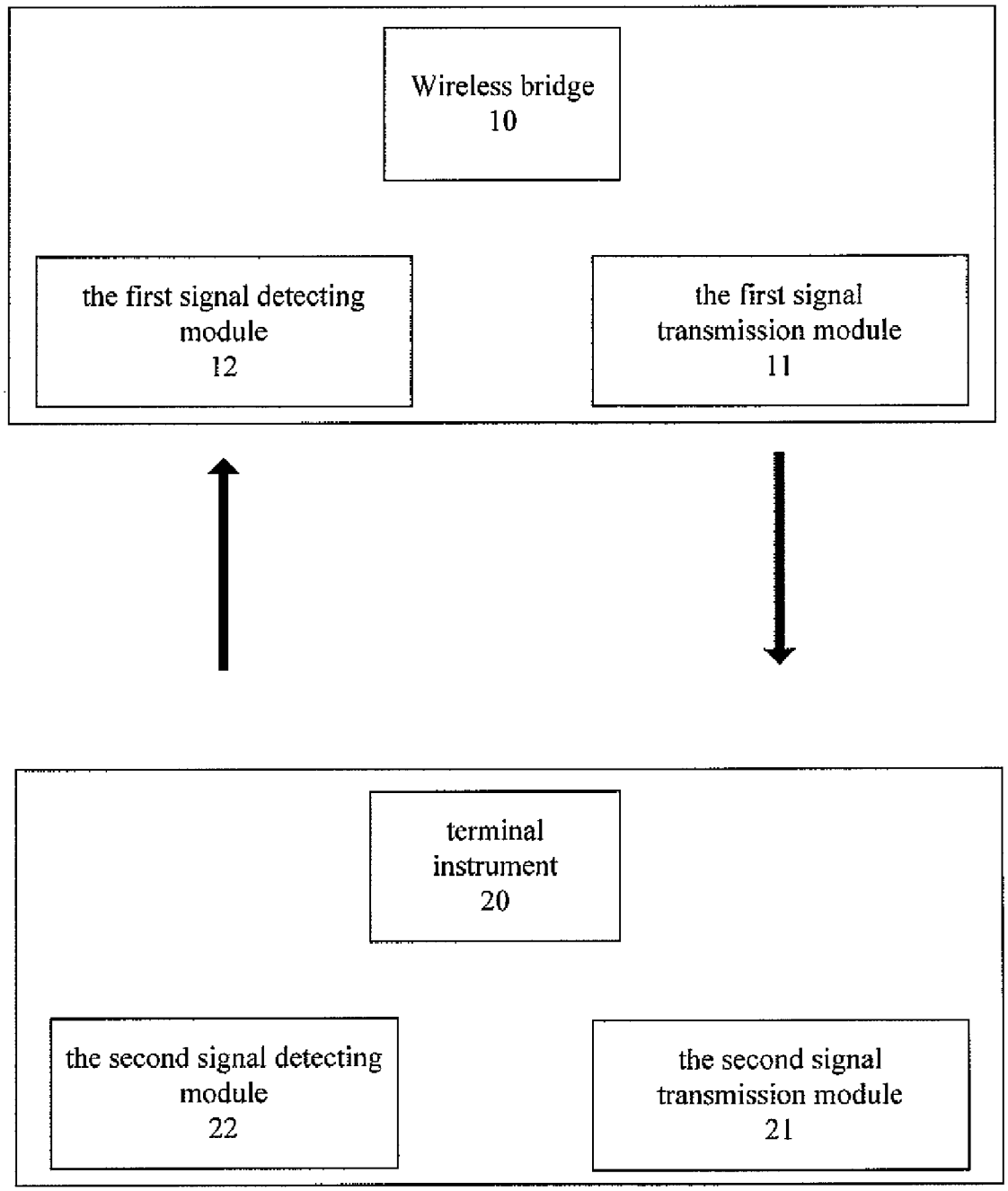
FIG. 1 shows a schematic diagram relating to signal transmission between a wireless bridge and a terminal instrument according to the present invention.

The present invention provides a wireless bridge with multiple modules for starting or interrupting a signal transmission; the present invention also provides different wireless signal transmission modes or statuses, according to different environment or condition. FIG. 1 illustrates a schematic diagram of a wireless bridge 10 and a terminal instrument 20 for transmitting signals. The wireless bridge 10 includes the first signal transmission module 11 for transmitting signals to the terminal instrument 20, and the first signal detection module 12 for detecting the signals transmitted from the terminal instrument 20. The terminal instrument 20 includes the second signal transmission module 21 for transmitting signal to the wireless bridge 10, and the second signal detection module 22 for detecting the signal transmitted from the wireless bridge 10.

In one embodiment of the invention, the wireless bridge 10 mentioned above can be adapted to wired network environment, including household, public place and office environment.

In one embodiment of the invention, according to whether the first signal detection module 12 detects the signal transmitted from the terminal instrument 20, the first signal transmission module 11 mentioned above determines the working status of the wireless bridge 10 to adjust the interval of signal transmission.

For example, the status of the wireless bridge 10 includes but not limited to a normal working mode (continuous transmitting signal mode), a delay mode and a idle mode. The aforementioned idle mode means that the wireless bridge 10 interrupts transmitting signal but doesn't shut down.

In one embodiment of the invention, according to the detection result of the first signal detection module 12, the first signal transmitting module 11 determines how to adjust the interval of signal transmission, including but not limited to extending the interval of signal transmission.

Figure 2:
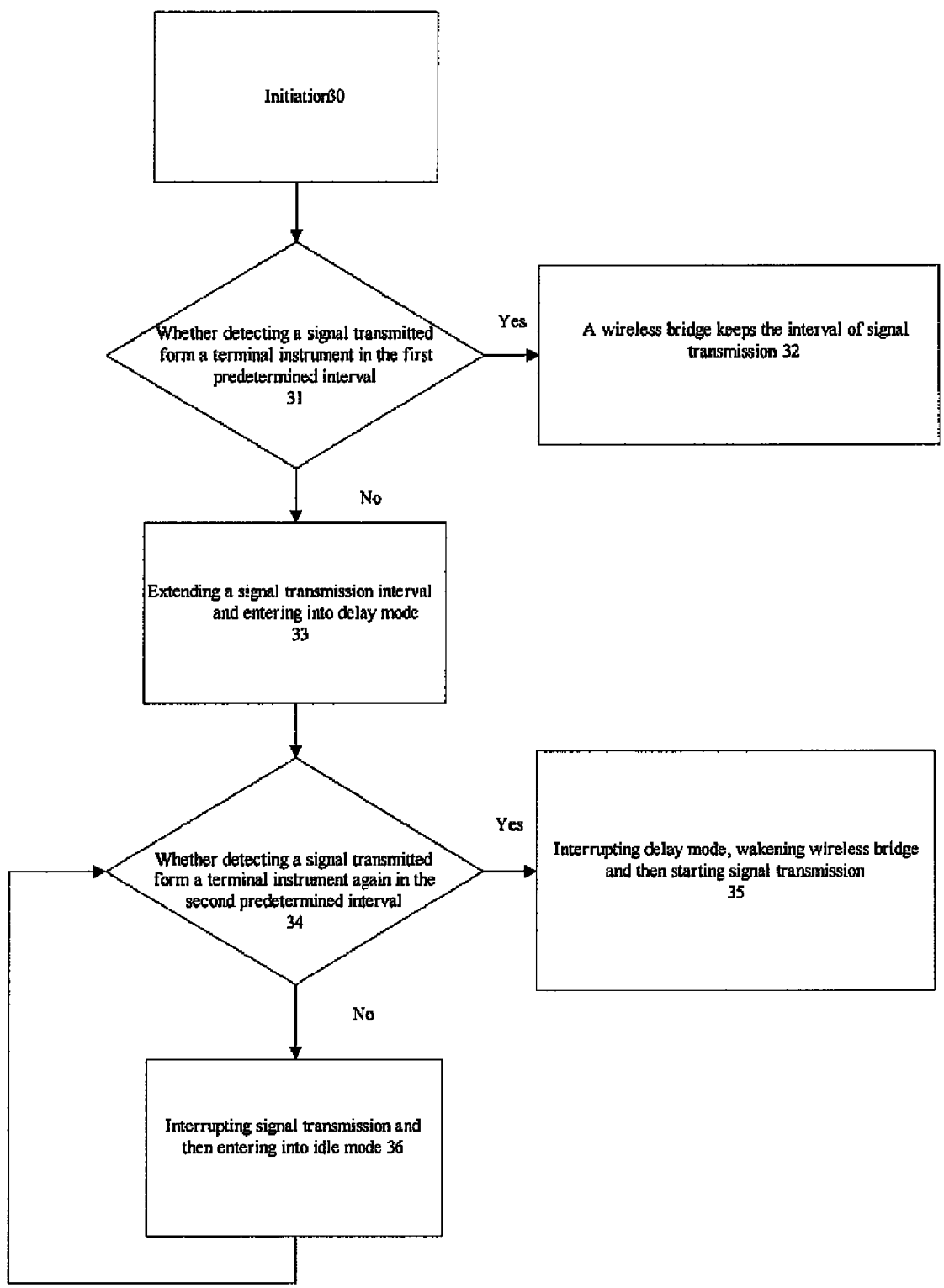
FIG. 2 shows a schematic diagram relating to a method for determining the working status of a wireless network communication device according to the present invention.

FIG. 2 illustrates a schematic diagram of the method 30 for determining the working status of a wireless network communication device according to the present invention. The following paragraph describes the steps of the method mentioned above. The wireless bridge 11 utilizes the first detection module 12 to detect whether there exists a requesting signal (probe request) or an environment searching signal (Broadcast packet or packet with destination address equal to this AP address) transmitted from a terminal instrument. The requesting signal or an environment searching signal mentioned above is utilized by a terminal instrument for searching the relating access points or bridges in the environment. If detecting the requesting signal from a terminal instrument, in general situation, the bridge or access point would connect to the terminal instrument by wireless connection, and exchange information with each other. In general, if detecting the requesting signal, the first signal transmitting module 11 and the terminal instrument 20 exchange information and transmit signal with each other. Alternatively, an authentication procedure will be processed prior to the wireless network communication device should transmit or receive information.

According to the status of user, the present invention determines the status of the wireless bridge 10, i.e. determines whether to extend the interval of signal transmission or not. In one embodiment, when the first signal detection module 12 continuously detects the requesting signals or environment searching signals transmitted from the terminal instrument 20 at the first predetermined interval in step 31, in the following step 32, the wireless bridge 10 would maintain the current interval of signal transmission; otherwise, if the first signal detection module 12 fails to detect a signal transmitted from the terminal instrument 20 in a specific or predetermined period of time, the wireless bridge 10 would transmit the detection result to a CPU, and then, in step 33, the CPU would command a MAC to extend the interval of beacons signal transmission.

Then, when the interval of beacons signal transmission extends to the predetermined interval, the bridge continues detecting whether receiving the requesting signal or the environment searching signal transmitted from a terminal instrument. Preferably, when the first detect module 12 detects a signal transmitted from the terminal instrument 20 in the predetermined time, the CPU would waken the wireless bridge 10 and then activates signal transmission; however, if the signal detection module 12 does not detect a signal transmitted from the terminal instrument 20 in the first predetermined time, the CPU of the wireless bridge 10 commands the wireless transmission module to sustain the least power for operation and the MAC to enter into the delay mode.

The step for extending the interval of the beacons signal transmission can repeat for multiple times and extend the span of the interval progressively.

Subsequently, according to whether the first detection module 12 detects a signal transmitted from the terminal instrument 20 in the second predetermined interval, step 34 determining whether the wireless bridge 11 continuously sustaining delay mode or idle mode. In one embodiment of the present invention, when the first signal detection module 12 detects a signal transmitted from the terminal instrument 20 again, step 35 would terminates delay mode and then wakens the wireless bridge 10 for signal transmission; on the contrary, if signal detection module 12 does not detect the requesting or the environment searching signal transmitted from a terminal instrument 20 after the predetermined interval, the CPU of the wireless bridge 10 commands the wireless transmitting module to interrupt transmitting signal, and then enter into the idle mode in step 36.

The advantage of the present invention provides a method for determining the status of wireless bridge 11, according to whether the terminal instrument 20 detects an requesting signal or an environment search signal; by this method, we can determine the status of the wireless bridge 11 and, according to the detection result, determine whether to extend the interval of signal transmission in the predetermined interval. Furthermore, when the interval extends to a predetermined interval, according to the detection result of the first signal detection module 12, we can determine whether the wireless bridge 10 should enter into the idle mode. Furthermore, when detecting an requesting signal or an environment search signal transmitted from a terminal instrument again, wakening the wireless bridge 11 from idle mode to continuously transmit signals. Another advantage of present invention is that the invention reduces the interference to the surrounding electronics and human body caused by signals continuously transmitted from the wireless bridge 10 to protect the health and environment.

Although preferred embodiments of the present invention have been described, it will be understood by those skilled in the art that the present invention should not be limited to the described preferred embodiments. Rather, various changes and modifications can be made and understood by those skilled in the art within the spirit and scope of the present invention, as defined by the following claims.

Having described the invention, the following is claimed:

1. A method for determining a working status of a wireless network communication device, comprising:
    detecting a requesting signal or an environment searching signal transmitted from a terminal instrument;
    determining if extending an interval of signal transmission or not, according to the result of detection, wherein said interval of signal transmission is adjusted by a signal transmission module of said wireless network communication device;
    entering into a delay mode, if said network communication device fails to receive said requesting signal or said environment searching signal transmitted from said terminal instrument in a first predetermined interval, wherein said delay mode is used to extend said interval of signal transmission by a MAC which is commanded by a CPU; and
    determining whether said wireless network communication device should be awaken or enter into an idle mode, according to whether detected said requesting signal or said environment searching signal transmitted from terminal instrument in a second predetermined interval.

2. A method for determining a working status of a wireless network communication device of claim 1, comprising: when detecting said requesting signal or said environment searching signal transmitted from said terminal instrument, said wireless network communication device maintains an current interval for signal transmission.

3. A method for determining the working status of a wireless network communication device of claim 1, wherein the step for extending said interval of signal transmission can repeat for multiple times and extending the span of said interval progressively.

4. A method for determining the working status of a wireless network communication device of claim 1, further comprising:
    if detecting said requesting signal or said environment searching signal transmitted from said terminal instrument in the first predetermined interval and then wakening said wireless network communication device; otherwise said wireless network communication device enters into said delay mode.

5. A method for determining the working status of a wireless network communication device of claim 1, further comprising:
    when extending to said second predetermined interval, if detecting said requesting signal or said environment searching signal transmitted from said terminal instrument, wakening said wireless network communication device;
    otherwise, shutting down a wireless transmission module of said wireless network communication device to interrupt signal transmission and entering into said idle mode.

6. A method for determining the working status of a wireless network communication device of claim 1, wherein said wireless network communication device comprises a signal transmission module for transmitting signal to said terminal instrument.

7. A method for determining the working status of a wireless network communication device of claim 1, wherein said wireless network communication device comprises a signal detection module for detecting said requesting signal or said environment searching signal transmitted from said terminal instrument.

8. A method for determining the working status of a wireless network communication device of claim 1, wherein said terminal instrument comprises a signal transmission module for transmitting said requesting signal or said environment searching signal to said wireless network communication device.

9. A method for determining the working status of a wireless network communication device of claim 1, wherein said terminal instrument comprises a signal detection module for detecting signals transmitted from said wireless network communication device.

10. A method for determining the working status of a wireless network communication device of claim 1, wherein said idle mode refers to interrupting signal transmission but not shutting said wireless network communication device down.

11. A method for determining the working status of a wireless network communication device of claim 1, wherein said method can apply to wired network environment, including household, public place or office environment.

12. A method for determining the working status of a wireless network communication device of claim 1, wherein said wireless network communication device comprises a router 'a gateway' a bridge or an access point.

13. A method for determining the working status of a wireless network communication device, comprising:
    providing said wireless network communication device with different signal transmission modes;
    detecting a requesting signal or an environment searching signal transmitted from a terminal instrument; and
    according to the signal detection result, adjusting said wireless signal transmission mode or status to reduce the signal interference caused by signals continuously transmitted from said wireless network communication device to lower environment magnetic wave and saving power;

wherein said wireless signal transmission modes comprising a normal mode, an extended mode, and a no-transmission mode;

wherein said extended mode is used to extend said interval of beacons signal transmission.

14. A method for determining the working status of a wireless network communication device of claim 13, wherein said wireless network communication device comprising a router, a gateway, a bridge or an access point.

15. A method for determining the working status of a wireless network communication device of claim 13, wherein said transmitting status of wireless signal including a normal working mode, a delay mode, and an idle mode.

16. A method for determining the working status of a wireless network communication device of claim 15, wherein said idle mode refers to interrupting signal transmission but not shutting said wireless network communication device down.

17. A method for determining the working status of a wireless network communication device of claim 13, wherein said method can apply to a wired environment comprising household, public place or office environment.

* * * * *